H. E. PROTZ.
HASP HOOK.
APPLICATION FILED MAY 5, 1911.

1,023,680.

Patented Apr. 16, 1912.

Witnesses

Inventor
Hugo E. Protz.
By Victor J. Evans
Attorney

UNITED STATES PATENT OFFICE.

HUGO E. PROTZ, OF SPARTA, WISCONSIN.

HASP-HOOK.

1,023,680. Specification of Letters Patent. Patented Apr. 16, 1912.

Application filed May 5, 1911. Serial No. 625,404.

*To all whom it may concern:*

Be it known that I, HUGO E. PROTZ, a citizen of the United States, residing at Sparta, in the county of Monroe and State of Wisconsin, have invented new and useful Improvements in Hasp-Hooks, of which the following is a specification.

An object of the invention is to provide a hook for attachment to a closure and to the casing thereof, the shank of the hook being adjustable relatively to the casing. For the purpose mentioned, use is made of a tubular casing having one end thereof reduced to form a bearing flange and the other end flattened and apertured to constitute an attaching portion, a shank slidably mounted in the said casing and having a hooked end extending exteriorly of the casing, the other end of the shank being provided with an enlarged portion and a spring disposed in the casing to encircle the said shank, the said spring having one end thereof adapted to abut against the mentioned bearing flange and the other end thereof abuts against the enlarged portion of the shank, the said tubular casing being preferably slotted.

Reference is to be had to the accompanying drawings constituting a part of this specification, in which similar characters of reference denote corresponding parts in all the views, and in which—

Figure 1:
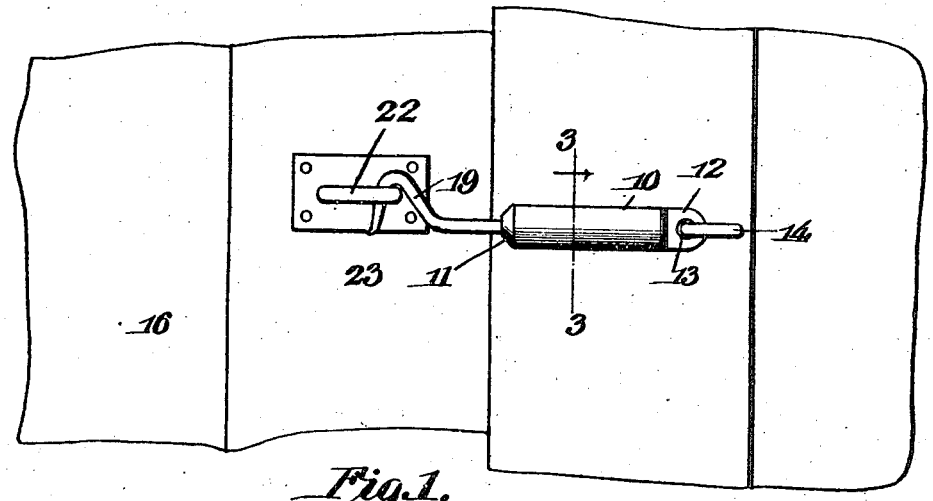
Figure 2:
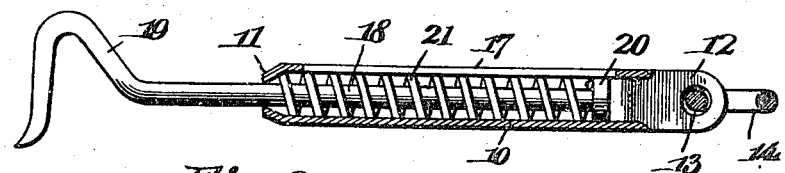
Figure 3:
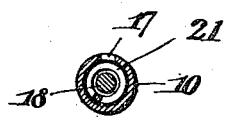

Figure 1 is a side elevation of my device showing the same attached to a closure and in removable engagement with the casing thereof. Fig. 2 is a longitudinal sectional view. Fig. 3 is a vertical section taken on the line 3—3 in Fig. 1 looking in the direction of the arrow.

Referring more particularly to the views I provide a tubular casing 10 having an end thereof reduced to form a bearing flange 11, the other end of the casing 10 being flattened into a solid portion 12 provided with an aperture 13 adapted to have mounted therethrough an attaching staple 14 provided with a threaded shank for connection to a closure 16. The casing 10 is preferably provided with a slot 17 for simplifying the formation of the casing from an integral piece of material and slidably mounted in the casing 10 is a shank 18 having a hooked portion 19 extending exteriorly of the casing and formed at one end of the shank, the other end of the shank being formed into an enlarged flange 20. Mounted in the casing 10 is an expansion spring 21, the said spring being disposed between the bearing flange 11 and the enlarged flange 20 of the shank 18 and the said spring being positioned to encircle the shank 18.

In the use of my device, the same is attached to the closure 16 as heretofore mentioned and the hook 19 is adapted for engagement with an eye 22 secured to a casing 23 of the closure 16. By providing the spring 21, positioned in the casing 10 as mentioned, the shank 18 will at all times be adjustable relatively to the casing 10, that is, the shank can be pulled outwardly against the action of the spring and when released will be returned to normal position by the expansible power of the spring 21. By employing the stop flange 20 of the shank 18 it will be impossible to entirely withdraw the shank from the casing 10 inasmuch as the flanged portion 11 of the casing 10 is of a smaller diameter than the flange 20.

My device can be used in connection with all kinds of closures and the casings thereof and is particularly adaptable for use in connection with barns and house doors and other respective casings.

Having thus fully described the invention, what I claim as new, is:—

As an article of manufacture the combination with a tubular casing, formed of an integral piece of material having one end thereof flattened to form a solid portion provided with an aperture adapted to receive an attaching member and the other end thereof reduced to form a bearing flange, of a shank mounted to slidably extend within the casing and terminating at one end thereof in an enlarged head and at the other end thereof in a hook and a spring mounted within the said casing, to encircle the said shank, with an end of the said spring abutting against the said head and the other end thereof abutting against the said bearing flange.

In testimony whereof I affix my signature in presence of two witnesses.

HUGO E. PROTZ.

Witnesses:
MICHAEL A. STELLICK,
ADOLPH A. BEHRENDT.